(12) United States Patent
Edie

(10) Patent No.: US 6,211,476 B1
(45) Date of Patent: *Apr. 3, 2001

(54) AIR BAG COVER WITH HORN SWITCH

(75) Inventor: Dale C. Edie, Allenton, MI (US)

(73) Assignee: TRW Safety Systems Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,569

(22) Filed: Jul. 24, 1998

(51) Int. Cl.$^7$ .................................................... B60R 21/16
(52) U.S. Cl. ................................... 200/61.08; 200/61.54; 280/731
(58) Field of Search ............................ 200/61.08, 61.54; 280/728.1, 731, 732

(56) References Cited

U.S. PATENT DOCUMENTS

| | | | |
|---|---|---|---|
| 5,563,354 | * 10/1996 | Kropp | 280/731 X |
| 5,585,606 | 12/1996 | Ricks | 200/61.08 |
| 5,684,283 | 11/1997 | Hambleton, Jr. et al. | 200/61.08 |
| 5,685,560 | 11/1997 | Sugiyama et al. . | |
| 5,721,409 | 2/1998 | Enders | 200/61.54 |
| 5,794,968 | * 8/1998 | Yamamoto et al. | 280/731 X |
| 5,836,609 | * 11/1998 | Coleman | 280/731 X |

\* cited by examiner

*Primary Examiner*—Renee Luebke
(74) *Attorney, Agent, or Firm*—Tarolli, Sundheim, Covell, Tummino & Szabo L.L.P.

(57) ABSTRACT

An apparatus (10) for covering an inflatable vehicle occupant protection device (40) comprises a cover (70) including first and second portions (100, 110). The cover (70) is movable from a closed condition to an open condition upon inflation of the inflatable device (40). The cover (70) has a cover tear seam (90, 92) defining the first and second portions (100, 110) of the cover. The apparatus (10) includes a switch (130) in an electric circuit for actuating an electrically actuatable device (131) of the vehicle. The switch (130) includes a first switch portion (132) underlying the first cover portion (100) and a second switch portion (134) underlying the second cover portion (100). The first cover portion (100) is manually depressible to operate the first switch portion (132) and thereby to actuate the electrically actuatable device (131). The second cover portion (110) is manually depressible to operate the second switch portion (134) and thereby to actuate the electrically actuatable device (131). The switch (130) has a bridge portion (136) underlying and extending across the cover tear seam (90, 92). The bridge portion (136) of the switch (132) electrically interconnects the first switch portion (132) and the second switch portion (134) when the cover portions (100, 110) are in the closed condition. The bridge portion (136) is rupturable upon movement of the cover (70) from the closed condition to the open condition. One of the bridge portion (136) and the first and second switch portions (132, 134) has a switch actuator portion (172) underlying and extending across the cover tear seam (92). The switch actuator portion (172), when manually depressed, actuates the electrically actuatable device (131).

10 Claims, 3 Drawing Sheets

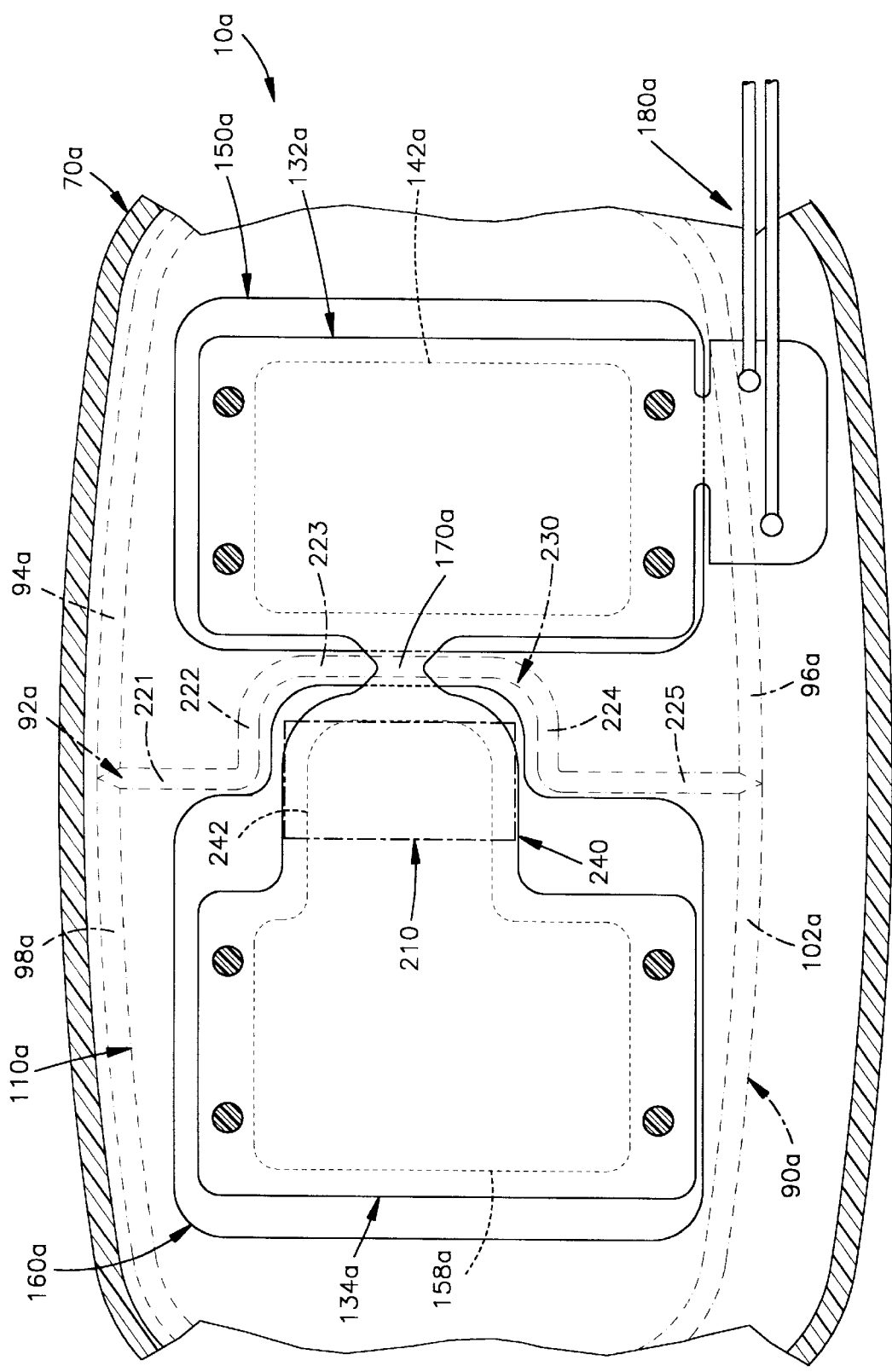

AIR BAG COVER WITH HORN SWITCH

BACKGROUND OF THE INVENTION

1. Technical Field

The present invention relates to a switch for mounting on a portion of a vehicle as part of a vehicle safety apparatus. In particular, the present invention relates to a horn switch that is part of an air bag module mounted on a vehicle steering wheel.

2. Description of the Prior Art

It is known to mount an air bag module on a steering wheel of a vehicle to help protect the driver of the vehicle. The air bag module includes an air bag and an inflator. In the event of sudden vehicle deceleration of a magnitude which requires protection of the driver, the inflator is actuated to inflate the air bag into a position to help protect the driver of the vehicle.

It is known to provide a horn switch that is operable by pressing on a cover of an air bag module mounted on a vehicle steering wheel. U.S. Pat. No. 5,585,606 discloses a membrane type horn switch which is connected with an air bag module cover. The horn switch includes two active parts, each secured for movement with a respective movable part of the cover. The cover has a tear seam which releasably joins the movable parts of the cover. When the air bag inflates, a rupturable portion of the switch tears to enable the movable cover parts to open so that the air bag can inflate out of the cover. The rupturable portion of the switch underlies the tear seam in the module cover.

SUMMARY OF THE INVENTION

The present invention is an apparatus for covering an inflatable vehicle occupant protection device. The apparatus comprises a cover including first and second portions. The cover is movable from a closed condition to an open condition upon inflation of the inflatable device. The cover has a cover tear seam defining the first and second portions of the cover. The apparatus includes a switch in an electric circuit for actuating an electrically actuatable device of the vehicle. The switch includes a first switch portion underlying the first cover portion and a second switch portion underlying the second cover portion. The first cover portion is manually depressible to operate the first switch portion and thereby to actuate the electrically actuatable device. The second cover portion is manually depressible to operate the second switch portion and thereby to actuate the electrically actuatable device. The switch has a bridge portion underlying and extending across the cover tear seam. The bridge portion of the switch electrically interconnects the first switch portion and the second switch portion when the cover portions are in the closed condition. The bridge portion is rupturable upon movement of the cover from the closed condition to the open condition. One of the bridge portion and the first and second switch portions has a switch actuator portion underlying and extending across the cover tear seam. The switch actuator portion when manually depressed actuates the electrically actuatable device.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a plan view similar to FIG. 2 of a horn switch in accordance with a second embodiment of the present invention.

DESCRIPTION OF PREFERRED EMBODIMENTS

Figure 1:
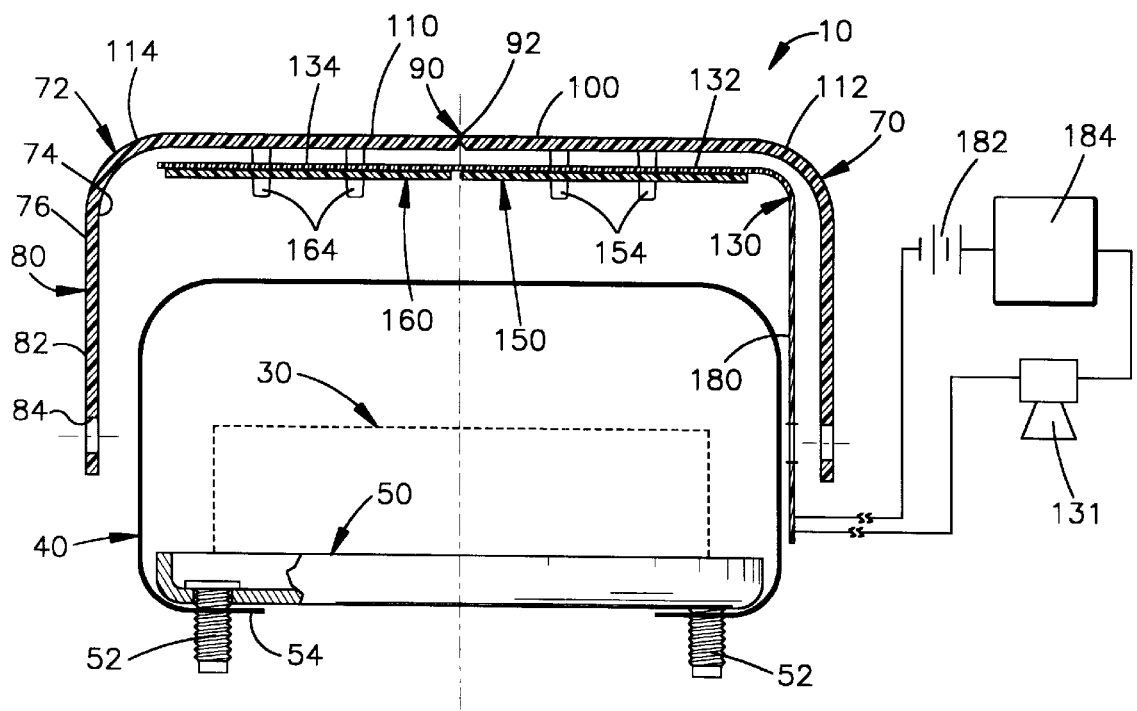
FIG. 1 is a schematic view, partially in section, showing a horn switch as part of an air bag module mounted on a vehicle steering wheel.

The present invention relates to a vehicle safety apparatus including a switch. In particular, the present invention relates to an air bag module which includes a switch for an electrically actuatable device of the vehicle, such as a vehicle horn. As representative of the present invention, FIG. 1 illustrates an air bag module 10. The air bag module 10 is mounted on a vehicle steering wheel (not shown) which is supported on a steering shaft or steering column of the vehicle.

The air bag module 10 includes an inflator shown schematically at 30. The inflator 30 has one or more fluid outlets for directing inflation fluid into an air bag 40 upon actuation of the inflator. The inflator may be a pyrotechnic inflator which uses the combustion of gas-generating material to generate inflation fluid in the form of gas to inflate the air bag 40. The module 10 alternatively could include an inflator which contains a stored quantity of pressurized inflation fluid, or a combination of pressurized inflation fluid and ignitable material for heating the inflation fluid.

The air bag 40 is illustrated schematically in a deflated, packed condition in FIG. 1. The air bag 40 is preferably made from a fabric material such as woven nylon. The air bag 40 can alternatively be made from non-woven material, such as plastic film. The use of plastic film, in particular, would require inflation fluid vents to be formed in the air bag 40, as is known in the art.

The module 10 includes a retaining ring 50 from which extend a plurality of fasteners 52, such as weld studs. The fasteners 52 on the retaining ring 50 extend through openings in an end portion 54 of the air bag 40. The retaining ring 50 is secured to a portion of the module such as a base plate (not shown) by nuts (not shown) screwed onto the fasteners 52. The end portion 54 of the air bag 40 is clamped between the base plate and the retaining ring 50, and the base plate is fastened to the vehicle steering wheel. As a result, the air bag 40 is secured in position on the vehicle steering wheel, adjacent to the inflator 30.

The vehicle includes known means (not shown) for sensing a collision involving the vehicle and for actuating the inflator 30 in response to the sensing of a collision. The means may include a deceleration sensor and vehicle electric circuitry for actuating the inflator 30 in response to sensing a vehicle deceleration indicative of a vehicle collision having a severity greater than a predetermined threshold value. As discussed below, the means provides an electric signal over lead wires to the inflator 30, when the inflator is to be actuated.

The air bag module 10 includes a cover 70 for enclosing the air bag 40 and the inflator 30. The cover 70 is made from a material which is strong enough to protect the parts of the air bag module 10 which are enclosed within the cover. The material of the cover 70 is sufficiently flexible or deformable that it can be resiliently deformed or depressed inwardly (that is, in a downward direction as viewed in FIG. 1) by pressure from an occupant of the vehicle, so as to actuate an electrical device of the vehicle such as the vehicle horn.

The cover 70 has a main body portion 72 which has inner and outer side surfaces 74 and 76. The main body portion 72 of the cover 70 includes a fixed part 80 of the cover. A mounting flange or mounting portion 82 of the cover 70 extends from the main body portion 72 in a direction toward the base plate 20. A plurality of first fastener openings 84 are formed in the mounting portion 82 of the cover 70. Fasteners (not shown) such as rivets extend through the fastener openings 84 in the mounting portion 82 of the cover 70 to secure the cover to the vehicle.

Figure 2:
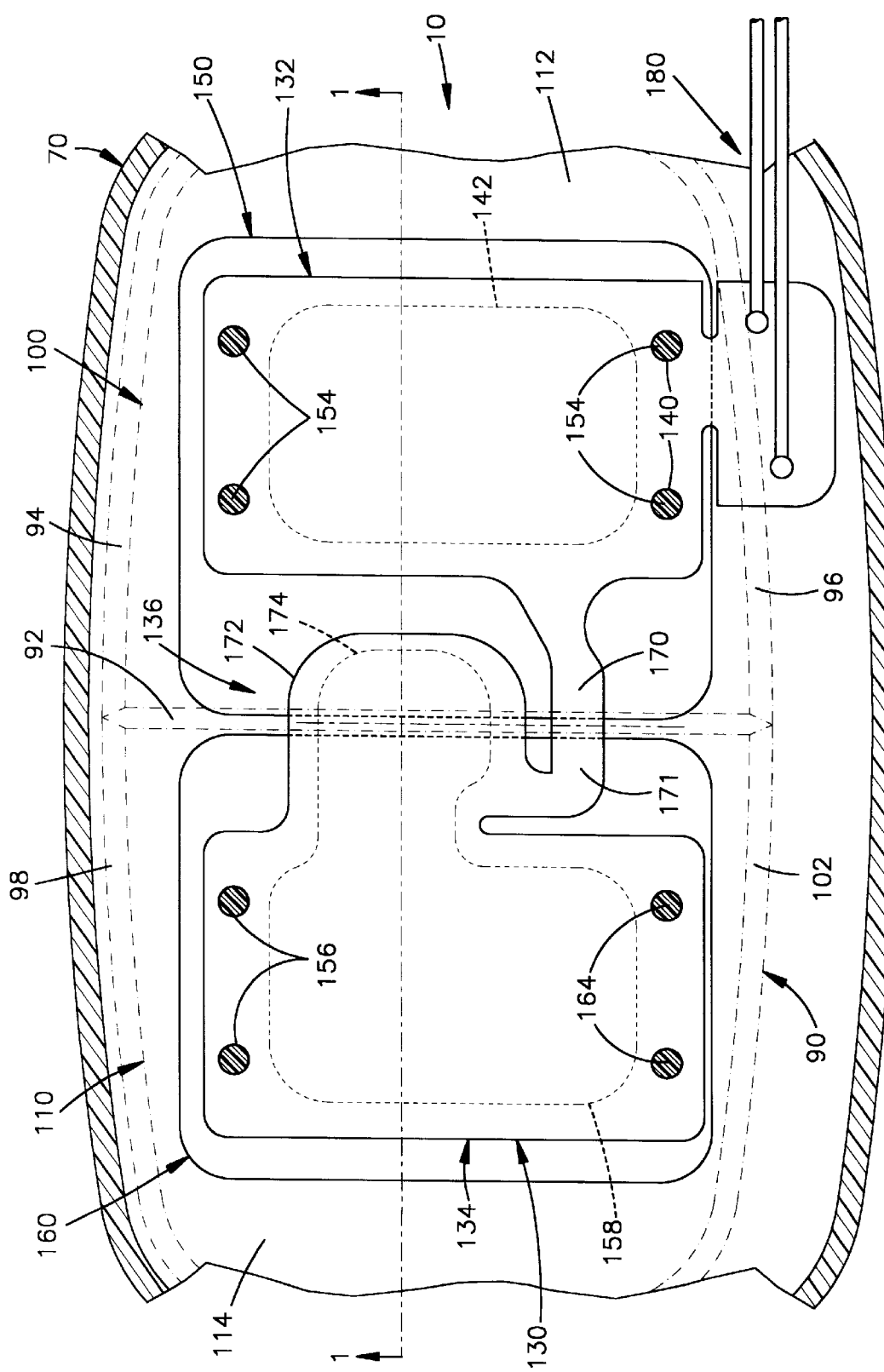
FIG. 2 is a schematic plan view of portions of the air bag module of FIG. 1 including the horn switch.

An I-shaped tear seam 90 (FIG. 2) is formed in the main body portion 72 of the cover 70. The tear seam 90 includes a linear central or base section 92 and four side sections 94, 96, 98 and 102. The tear seam 90 constitutes a weakened portion of the cover 70 which is rupturable under the force of the inflating air bag 40 to enable the air bag to inflate out of the cover.

The tear seam 90 partially defines first and second movable parts 100 and 110 of the cover. Each one of the first and second movable cover parts 100 and 110 has a generally rectangular configuration. The base section 92 and the side sections 94 and 96 of the tear seam 90 extend along three sides of the first movable cover part 100. A first hinge portion 112 of the cover 70 extends along the fourth side of the first movable cover part 100, between the two side sections 94 and 96 of the tear seam 90. The first hinge portion 112 connects the first movable cover part 100 to the fixed cover part 80 for pivotal movement relative to the fixed cover part.

The base 92 and the other two side sections 98 and 102 of the tear seam 90 extend along three sides of the second movable cover part 110. A second hinge portion 114 of the cover 70 extends along the fourth side of the second movable cover part 110, between the two side sections 98 and 102 of the tear seam 90. The second hinge portion 114 connects the second movable cover part 110 to the fixed cover part 80 for pivotal movement relative to the fixed cover part.

The air bag module 10 includes a switch 130 for actuating an electrically actuatable device of the vehicle, such as a vehicle horn indicated schematically at 131 (FIG. 1). In the preferred embodiment, the switch 130 is a membrane switch of a known type which includes first and second layers of electrically conductive material (not shown) normally separated by a dielectric material. The layers of conductive material are supported on a non-conducting substrate material. The layers of conductive material are engageable with each other, in response to the application of force to the switch 130, to complete a circuit in the switch.

The switch 130 includes first and second switch portions 132 and 134 located on opposite sides of an intermediate portion or bridge portion 136. The first and second switch portions 132 and 134 are physically and electrically interconnected by the bridge portion 136, as described below.

The first switch portion 132 underlies the first cover part 100. Four fastener openings 140 are formed in the first switch portion 132. The first switch portion 132 has an active area 142, indicated by dashed lines, which encompasses most of the area of the first switch portion, save for the outer edge portion and the fastener openings 140. The first and second layers of conductive material of the switch 130, as well as the substrate material, extend continuously over the active area 142 of the first switch portion 132.

A rigid first back plate 150 is located at a position underlying the first switch portion 132. (The spacing between the first movable cover part 100, and the first switch portion 132 is exaggerated, for clarity, in FIG. 1.) Four fastener openings (not shown) are formed in the first back plate 150 and underlie the first switch portion.

Four fasteners 154 (FIG. 1) in the form of pins extend inward from the first movable cover part 100. The pins 154 extend through the fastener openings 140 in the first switch portion 132 and into the fastener openings in the first back plate 150. The pins 154 have a press fit in the fastener openings in the first back plate 150 and securely fasten the first back plate to the first movable cover part 100. The pins 154 maintain the first switch portion 132 in position between the first back plate 150 and the inner side surface of the first movable cover part 100.

The first back plate 150 provides a relatively rigid support for the first switch portion 132, so that force applied to the first cover part 100 can result in operation of the first switch portion of the switch 130. The first back plate 150 and the first switch portion 132 are movable with the first movable cover part 100 upon opening of the cover 70.

The second switch portion 134 underlies the second movable cover part 110. Four fastener openings 156 are formed in the second switch portion 140. The second switch portion 134 has an active area 158, indicated by the dashed lines, which encompasses most of the area of the second switch portion, save for the outer edge portion and the fastener openings 156. The first and second layers of conductive material of the switch 130, as well as the substrate material, extend continuously over the active area 158 of the second switch portion 134.

A rigid second back plate 160 is located at a position underlying the second switch portion 134. (The spacing between the second movable cover part 110, and the second switch portion 134 is exaggerated, for clarity in FIG. 1.) Four fastener openings (not shown) are formed in the second back plate 160 and underlie the second switch portion 134.

Four fasteners 164 (FIG. 1) in the form of pins extend inward from the second movable cover part 110. The pins 164 extend through the fastener openings 156 in the second switch portion 134 and into the fastener openings in the second back plate 160. The pins 164 have a press fit in the fastener openings in the second back plate 160 and securely fasten the second back plate to the second movable cover part 110. The pins 164 maintain the second switch portion 134 in position between the second back plate 160 and the inner side surface of the second movable cover part 110.

The second back plate 160 provides a relatively rigid support for the second switch portion 134, so that force applied to the second cover part 110 can result in operation of the second switch portion of the switch 130. The second back plate 160 and the second switch portion 134 are movable with the second movable cover part 110 upon opening of the cover 70.

The bridge portion 136 (FIG. 2) of the switch 130 extends between the first and second switch portions 132 and 134, and underlies or extends across the base section 92 of the tear seam 90. The bridge portion 136 includes a first part 170 and a second part 172.

The first part 170 of the bridge portion 136 extends from the first switch portion 132 and across the base section 92 of the cover tear seam 90. An end portion 171 of the first part 170 overlies the second back plate 160, adjacent to the second switch portion 134. The end portion 171 of the first part 170 of the bridge portion 136 is connected with the second part 172 of the bridge portion.

The second part 172 of the bridge portion 136 of the switch is substantially wider than the first part 170 of the bridge portion, as measured in the direction along the length of the base section 92 of the cover tear seam 90. The first part 170 of the bridge portion 136 is very narrow compared to either the second part 172 or the first and second switch portions 132 and 134. As a result, the first part 170 of the bridge portion, as discussed below, is rupturable upon movement of the cover 70 to the open condition.

The second part 172 of the bridge portion 136 is contiguous with and is connected for movement with the second switch portion 134. The second part 172 of the bridge portion 136 extends from the second switch portion 134 across the base section 92 of the cover tear seam 90 and thus extends across the gap between the two back plates 150 and 160.

The second part 172 of the bridge portion 136 of the switch has an active area 174. The active area 174 on the bridge portion 136 is electrically connected, in a manner not shown, with the active area 142 on the first switch portion 132. The active area 174 is contiguous with and extends from the active area 158 of the second switch portion 134. The active area 174 extends across and underlies the base section 92 of the cover tear seam 90 and is located generally equidistant between the side sections 94, 96, 98 and 102 of the cover tear seam 90. Thus, the active area 174 on the bridge portion 136 of the switch 130 is located generally under the center of the cover 70.

A lead assembly 180 extends from the first switch portion 132, across the side section 96 of the cover tear seam 90, and into a position underlying the fixed portion 80 of the cover. The lead assembly 180 connects the switch 130 with the vehicle horn 131 (FIG. 1), with a power source 182 such as the vehicle battery, and with other vehicle electric circuitry indicated schematically at 184.

To effect operation of the vehicle horn 131, the driver of the vehicle presses on the cover 70 of the air bag module 10 in a downward direction as viewed in FIG. 1. The force applied to the cover 70 of the air bag module 10 is transmitted through the cover to the switch 130. Specifically, force applied to the first movable cover part 100 is transmitted to the first switch portion 132. The first switch portion 132 is operated, and the vehicle horn 131 is energized. When force is applied to the second movable cover part 110, the force is transmitted to the second switch portion 134, the second switch portion is operated, and the vehicle horn 131 is energized.

When force is applied to the base section 92 of the cover tear seam 90, the force is transmitted to the bridge portion 136 of the switch 130. The active area 174 of the bridge portion 136 of the switch 130 is operated, and the vehicle horn 131 is energized.

When the force on the cover 70 of the air bag module 10 is released, the resilience of the cover causes it to move away from the air bag 40. As this movement occurs, the switch 130 returns to its original condition, and the vehicle horn 131 is de-energized.

Depending on the configuration of the bridge portion 136 of the switch 130, the horn 131 can be energized by depressing various portions of the cover 70 along the base section 92 of the cover tear seam 90. For example, the active area 174 of the bridge portion 136 extends for about 40% of the length of the first and second switch portions 132 and 134 (measured vertically as viewed in FIG. 2). The relative dimensions and locations of the bridge portion parts 170 and 172 can be varied from the configuration shown to provide for horn energization by pressing on more, or different, areas of the cover 70 along the length of the base section 92 of the cover tear seam 90.

In the event of an impact to the vehicle of a magnitude greater than the predetermined threshold value, the sensing means provides an electrical signal over lead wires to the inflator 30. The inflator 30 is actuated in a known manner. Inflation fluid flows out of the inflator 30 and into the air bag 40. The rapidly flowing inflation fluid causes the air bag 40 to inflate in an upward direction as viewed in FIG. 1.

The force of the inflating air bag 40 is applied toward the inside of the switch 130 and the cover 70. Specifically, the inflating air bag 40 pushes outward against the first and second back plates 150 and 160 and against the inner side surface 74 of the cover 70. The cover 70 opens along the I-shaped tear seam 90, which is the predetermined weakened portion of the cover. The first and second movable cover parts 100 and 110 move away from each other, pivoting about the hinge portions 112 and 114, respectively, to an open condition.

When the cover 70 opens, the first movable cover portion 100 moves away from the second movable cover portion 110. The first switch portion 132 moves with the first movable cover part 100. The second switch portion 134 moves with the second movable cover part 110, relative to the first switch portion 132. As this movement occurs, force is transmitted to the bridge portion 136 of the switch 130. The bridge portion 136 of the switch 130 ruptures along the narrow first part 170. The electrical connection between the first and second switch portions 132 and 134 is broken. The cover 70 opens sufficiently that the air bag 40 inflates between the first and second movable cover parts 100 and 110 into a position to help protect the vehicle occupant.

The switch 130 can be used to actuate an electrically actuatable device of the vehicle other than the vehicle horn 131. For example, the switch 130 could be used to actuate or control the vehicle radio, speed control, etc. Alternatively, the switch 130 could have a plurality of electrically independent active areas for controlling a plurality of electrically actuatable devices including the vehicle horn 131.

FIG. 3 illustrates an air bag module 10*a* in accordance with a second embodiment of the present invention. The air bag module 10*a* is generally similar in construction and operation to the air bag module 10 (FIGS. 1 and 2) and parts which are the same or similar are given the same reference numerals with the suffix "a" added.

The air bag module 10*a* includes a horn switch 130*a*. The horn switch 130*a* includes first and second switch portions 132*a* and 134*a*. In the air bag module 10*a*, the base section 92*a* of the cover tear seam 90*a* is not linear but instead is diverted around an emblem 210 located on the outside of the cover 70*a*. The emblem 210 is a decorative emblem, such as one containing the logo of the vehicle manufacturer.

The base section 92*a* of the cover tear seam 90*a* includes a first part 221 extending generally perpendicular to the side sections 94*a* and 98*a*. A second part 222 of the base section 92*a* extends perpendicular to the first part 221 in a direction toward the first switch portion 132*a*. A third part 223 of the base section 92*a* extends parallel to the first part 221, and a fourth part 224 extends parallel to the second part 222 in a direction toward the second switch portion 134*a*. A fifth part 225 of the base section 92*a* is collinear with the first part 221 and extends to the side sections 96*a* and 102*a*.

The second, third and fourth parts 222–224 of the base section 92*a* of the cover tear seam 90*a* partially define a generally rectangular central area 230 of the cover 70*a*. The emblem 210 is located in the central area 230 of the cover 70*a*. The first and fifth parts 221 and 225 of the base section 92 lie on an imaginary line which extends through the central area 230 of the cover 70*a*.

The horn switch 130a includes a third switch portion 240 which extends from the second switch portion 134a. The third switch portion 240 underlies the emblem 210 and the central area 230 of the cover 70a. A rupturable bridge portion 170a of the horn switch 130a electrically and mechanically interconnects the third switch portion 240 and the first switch portion 132a.

The third switch portion 240 has an active area 242. The active area 242 is contiguous with and extends from the active area 158a of the second switch portion 134a. The active area 242 underlies the emblem 210 and the central area 230 of the cover 70a. An imaginary line along the first and fifth parts 221 and 225 of the base section 92a of the cover tear seam 90a extends through the active area 242 of the third switch portion 240. As a result, the active area 242 of the third switch portion 240 is likely to be operated if the driver of the vehicle presses on the emblem 210, which is typically centrally located for decorative reasons.

Figure 4:
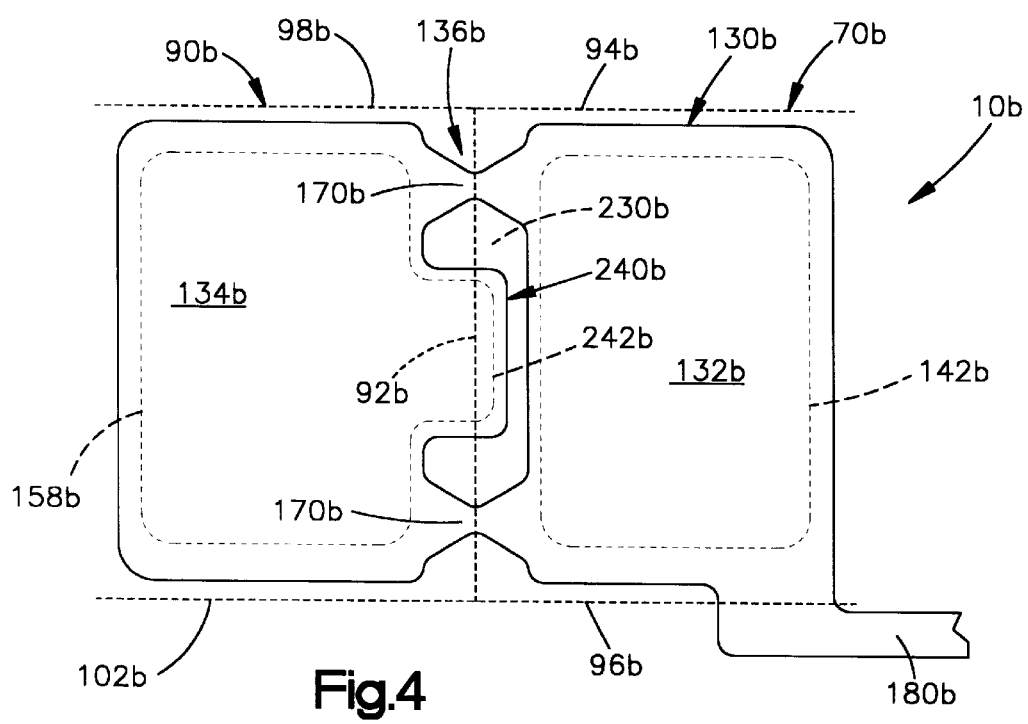
FIG. 4 is a schematic plan view of a horn switch in accordance with a third embodiment of the present invention.

FIG. 4 illustrates schematically an air bag module 10b in accordance with a third embodiment of the present invention. The air bag module 10b is generally similar in construction and operation to the air bag module 10a (FIG. 3) and parts which are the same or similar are given the same reference numerals with the suffix "b" added.

The air bag module 10b includes a horn switch 130b. The horn switch 130b includes a bridge portion 136b which comprises two rupturable bridge sections 170b. Each one of the bridge sections 170b extends between and electrically interconnects the first switch portion 132b and the second switch portion 134b. The bridge sections 170b are spaced apart along the length of the base section 92b of the cover tear seam 90b. Disposed between the bridge sections 170b is an third portion 240b of the horn switch 130b.

The third switch portion 240b extends from the second switch portion 134b. The third switch portion 240 underlies the central area 230b of the cover 70b. The third switch portion 240b has an active area 242b. The active area 242b is contiguous with and extends from the active area 158b of the second switch portion 134b. The active area 242b underlies the central area 230b of the cover 70a. An imaginary line extending vertically (as viewed in FIG. 4) through the center of the cover 70b extends through the active area 242b of the third switch portion 240b. As a result, the active area 242b of the third switch portion 240b is likely to be operated if the driver of the vehicle presses on the central area 230b of the cover 70b.

From the above description of the invention, those skilled in the art will perceive improvements, changes and modifications. For example, the present invention is not limited to an air bag module which is mounted on a vehicle steering wheel. The present invention can be used with an air bag module mounted on a vehicle instrument panel, a vehicle seat or door panel, or other portion of the vehicle. Such improvements, changes and modifications within the skill of the art are intended to be covered by the appended claims.

Having described the invention, I claim:

1. An apparatus for covering an inflatable vehicle occupant protection device, said apparatus comprising:

a cover including first and second portions and being movable from a closed condition to an open condition upon inflation of the inflatable device, said cover having a cover tear seam defining said first and second portions of said cover, said cover having a central area; and a switch in an electric circuit for actuating an electrically actuatable device of the vehicle, said switch including a first switch portion underlying said first cover portion and a second switch portion underlying said second cover portion;

said first cover portion being manually depressible to operate said first switch portion to actuate said electrically actuatable device, said second cover portion being manually depressible to operate said second switch portion to actuate said electrically actuatable device;

said switch having a switch tear seam releasably joining said first and second switch portions;

said cover tear seam including a diverted portion which extends around a defined portion of said central area of said cover;

said switch having a central switch portion which projects from said second switch portion and underlies said central area of said cover, part of said central switch portion being operable to actuate said electrically actuatable device;

said central area of said cover being manually depressible to operate said part of said central switch portion to actuate said electrically actuatable device, said part of said central switch portion extending from said second switch portion, said part having a terminal end spaced away from said first switch portion.

2. An apparatus as set forth in claim 1 wherein said defined portion of said central area of said cover has a generally rectangular configuration.

3. An apparatus as set forth in claim 1 comprising a decorative emblem on an exterior surface of said cover and located on said defined portion of said central area of said cover.

4. An apparatus as set forth in claim 3 wherein said diverted portion of said cover tear seam extends around said decorative emblem.

5. An apparatus as set forth in claim 1 wherein said diverted portion of said cover tear seam has a non-linear configuration.

6. An apparatus as set forth in claim 5 wherein said cover tear seam has a base section disposed between said first and second cover portions, said base section including end portions extending along an imaginary line between said first and second cover portions, said imaginary line extending through said central area of said cover and through said central switch portion, said cover being manually depressible along said cover tear seam and along said imaginary line to operate said central switch portion to actuate said electrically actuatable device.

7. An apparatus for covering an inflatable vehicle occupant protection device, comprising:

a cover including first and second portions and being movable from a closed condition to an open condition upon inflation of the inflatable device, said cover having a cover tear seam defining said first and second portions of said cover; and a switch in an electric circuit for actuating an electrically actuatable device of the vehicle, said switch including a first switch portion underlying said first cover portion and a second switch portion underlying said second cover portion;

said first cover portion being manually depressible to operate said first switch portion and thereby to actuate said electrically actuatable device, said second cover portion being manually depressible to operate said second switch portion and thereby to actuate said electrically actuatable device;

said switch having a bridge portion underlying and extending across said cover tear seam, said bridge portion of said switch electrically interconnecting said first switch portion and said second switch portion when said cover is in the closed condition, said bridge portion being rupturable upon movement of said cover from the closed condition to the open condition;

said bridge portion having a switch actuator portion underlying and extending across said cover tear seam, said cover tear seam when manually depressed operating said switch actuator portion and thereby actuating said electrically actuatable device;

said switch actuator portion extending from said second switch portion across said cover tear seam in a direction toward said first switch portion, said bridge portion also comprising a rupturable part extending from said first switch portion across said cover tear seam in a direction toward said second switch portion, said rupturable part having an end portion connected with said switch actuator portion adjacent to said second switch portion.

8. An apparatus for covering an inflatable vehicle occupant protection device, said apparatus comprising:

a cover including first and second cover portions and being movable from a closed condition to an open condition upon inflation of the inflatable device, said cover having a cover tear seam having a U-shaped configuration defining a projection of said second cover portion, said projection extending toward said first cover portion; and a switch in an electric circuit for actuating an electrically actuatable device of the vehicle, said switch including a first switch portion underlying said first cover portion and a second switch portion underlying said second cover portion;

said first cover portion being manually depressible to operate said first switch portion and actuate said electrically actuatable device, said second cover portion being manually depressible to operate said second switch portion and to actuate said electrically actuatable device;

said switch having a bridge portion underlying and extending across said cover tear seam, said bridge portion being rupturable upon movement of said cover from the closed condition to the open condition;

said bridge portion having a switch active area underlying said projection of said second cover portion;

said switch active area extending from said second switch portion in a direction toward said first switch portion, said switch active area having a terminal end spaced away from said first switch portion, said bridge portion also comprising a rupturable part spaced away from said switch active area, said rupturable part electrically interconnecting said first switch portion and said second switch portion when said cover is in the closed condition.

9. An apparatus for covering an inflatable vehicle occupant protection device, said apparatus comprising:

a cover including first and second portions and being movable from a closed condition to an open condition upon inflation of the inflatable device, said cover having a cover tear seam defining said first and second portions of said cover; and a switch in an electric circuit for actuating an electrically actuatable device of the vehicle, said switch including a first switch portion underlying said first cover portion and a second switch portion underlying said second cover portion;

said first cover portion being manually depressible to operate said first switch portion and actuate said electrically actuatable device, said second cover portion being manually depressible to operate said second switch portion and actuate said electrically actuatable device;

said switch having a bridge portion underlying and extending across said cover tear seam, said bridge portion being rupturable upon movement of said cover from the closed condition to the open condition;

said bridge portion having a switch active area underlying and extending across said cover tear seam, said cover tear seam, when manually depressed, operating said switch active area and thereby actuating said electrically actuatable device;

said switch active area extending from said second switch portion across said cover tear seam in a direction toward said first switch portion, said bridge portion extending in said first direction, said bridge portion having a terminal end spaced away from said first switch portion, said bridge portion also comprising a rupturable part spaced away from said switch active area, said rupturable part electrically interconnecting said first switch portion and said second switch portion when said cover is in the closed condition.

10. An apparatus for covering an inflatable vehicle occupant protection device, said apparatus comprising:

a cover including first and second cover portions and being movable from a closed condition to an open condition upon inflation of the inflatable device, said cover having a cover tear seam defining a straight line dividing said cover into two parts; and a switch in an electric circuit for actuating an electrically actuatable device of the vehicle, said switch including a first switch portion underlying said first cover portion and a second switch portion underlying said second cover portion;

said first cover portion being manually depressible to operate said first switch portion and actuate said electrically actuatable device, said second cover portion being manually depressible to operate said second switch portion and actuate said electrically actuatable device;

said switch having a bridge portion underlying and extending across said straight line, said bridge portion being rupturable upon movement of said cover from the closed condition to the open condition;

said bridge portion having a switch active area underlying and extending across said straight line;

said switch active area extending from said second switch portion in a direction toward said first switch portion, said switch active area having a terminal end spaced away from said first switch portion, said bridge portion also comprising a rupturable part spaced away from said switch active area, said rupturable part extending from said first switch portion in a direction toward said second switch portion and electrically interconnecting said first switch portion and said second switch portion when said cover is in the closed condition.

* * * * *